United States Patent [19]
Amtmann et al.

[11] 3,841,035
[45] Oct. 15, 1974

[54] CONCRETE PRESSURE VESSEL
[75] Inventors: Hans H. Amtmann, Rancho Santa Fe; Thomas Macken, San Diego, both of Calif.
[73] Assignee: General Atomic Company, San Diego, Calif.
[22] Filed: July 19, 1971
[21] Appl. No.: 163,969

[52] U.S. Cl............ 52/21, 220/46 MS, 220/56 R, 52/173, 52/249
[51] Int. Cl............................................. E04h 7/18
[58] Field of Search ........... 52/224, 248, 173, 21; 220/3, 46 MS, 55 R; 176/87

[56] References Cited
UNITED STATES PATENTS

| | | | |
|---|---|---|---|
| 1,635,482 | 7/1927 | Joyce | 220/46 MS |
| 3,114,471 | 12/1963 | Kropfl | 220/46 MS X |
| 3,478,920 | 11/1969 | Pechacek | 220/3 X |
| 3,504,460 | 4/1970 | Solberg | 52/98 |
| 3,568,379 | 3/1971 | Johnsson et al. | 52/224 X |
| 3,616,958 | 11/1971 | Mitchell | 220/3 |
| 3,640,038 | 2/1972 | Heron | 52/224 |

*Primary Examiner*—Frank L. Abbott
*Assistant Examiner*—C. D. Friedman
*Attorney, Agent, or Firm*—Fitch, Even, Tabin & Luedeka

[57] ABSTRACT

A concrete pressure containment vessel for a nuclear reactor is described wherein an access opening therein is sealed by a concrete closure member. Clearance is provided between the closure member and the pressure vessel, and the space between the closure member and the pressure vessel is sealed near the outer terminus of the penetration so that the closure member may be placed in compression by the pressure within the pressure vessel. A flow restrictor may be provided in the space between the closure member and the pressure vessel to limit flow of gas therethrough in the event of failure of the sealing means. Primary and secondary retaining means are provided, with the secondary retaining means acting to transfer axial forces on the closure member to the main body of the pressure vessel.

16 Claims, 9 Drawing Figures

INVENTORS
HANS. H. AMTMANN
THOMAS MACKEN
BY Fitch, Even, Tabin & Luedeka
ATTORNEYS INVENTORS
HANS. H. AMTMANN
THOMAS MACKEN
BY Fitch, Even, Tabin & Luedeka
ATTORNEYS INVENTORS
HANS. H. AMTMANN
THOMAS MACKEN
BY Fitch, Even, Tabin & Luedeka
ATTORNEYS

CONCRETE PRESSURE VESSEL

This invention relates generally to concrete pressure containment vessels and, more particularly, to an improved prestressed concrete pressure containment vessel for a nuclear reactor system.

The use of a prestressed concrete reactor vessel for enclosing various elements of a nuclear reactor system, such as the reactor core, fluid circulating equipment, and steam generating equipment, is well known in the art. Among the advantages of this form of reactor construction are its relatively low cost and its non-susceptibility to sudden explosive failure. In addition, the use of a plurality of prestressing tendons or strengthening cables for the concrete tends to mitigate against fault propagation in the reactor vessel since each tendon is independent of the others. Moreover, with the prestressing tendons embedded within the reactor vessel so that a portion of the vessel is between the tendons and the reactive core, the vessel thereby acts as a shield to avoid radiation embrittlement of the tendons. Prestressed concrete reactor vessels have also been found to be better adapted to erection in the field than thick metal containment vessels. This is because less dependence is required on the specialized skill and rigorous inspection associated with the welding of thick metal components.

Nuclear reactor systems are known wherein the entire primary system including the core, primary coolant circulators, steam generators, and associated main primary coolant ducting, is contained within a prestressed concrete reactor vessel. The fact that external main primary coolant ducts are eliminated by enclosing the entire primary system in the reactor vessel avoids the possibility of sudden loss of coolant due to ducting failure. Moreover, elaborate biological shielding in addition to the reactor vessel, for enclosing the steam generators and main primary coolant ducting (which may be necessary to deal with accidental primary circuit contamination) becomes unnecessary, since the reactor vessel itself performs this function.

Cooling of the reactor core is typically performed by means of a circulating fluid, which may thereafter be used to transfer heat to the steam generating equipment. The circulating fluid may be a gas which is chemically and nuclearly inert relative to the system, such as carbon dioxide or helium, or may be a liquid metal, such as liquid sodium, among others.

It is frequently desirable that certain of the internal elements of the nuclear reactor system be readily accessible for various reasons. For example, certain types of reactor malfunctions or accidents may require direct access to the reactor core for repair or replacement of various parts. In addition, it may be periodically necessary to effect repair and replacement of steam generating equipment or circulating equipment for the fluid coolant. Obviously, it is important that any penetration which permits access to the internal elements of the reactor system be adequately sealed and shielded during normal operation of the reactor. Moreover, it is important that any closure arrangement used for this purpose have sufficient integrity as to withstand high internal pressures resulting from accident situations.

Concrete pressure containment vessels for nuclear reactors have been designed in which one or more of the penetrations communicating with internal chambers in the pressure vessel are closed by a concrete closure plug. Naturally, to maintain the integrity of the pressure vessel, the closure plug and its associated elements must effect not only a pressure seal so as to maintain the pressure within the reactor vessel, and prevent leakage, but the plug itself must be retained against the forces tending to displace the plug axially and out of the penetration. Also, the closure plug itself should be adequately reinforced to provide the proper integrity for the closure.

One design of a concrete pressure containment vessel for a nuclear reactor which is of significant advantage is a design employing a closure plug of a size to fit within the penetration in the reactor vessel with a clearance space between the penetration liner and the plug. The space between the plug and the penetration liner is sealed near the outer terminus of the penetration to allow the plug to be compressively loaded about its periphery by the pressure within the pressure chamber. This prestresses the plug under a circumferential compressive load to prestress the plug in the same manner as prestressing tendons typically employed in the main portion of the pressure vessel. A primary retaining means is employed to secure the plug against axial forces and to transfer such axial forces to be ultimately borne by the prestressing tendons in the main portion of the pressure vessel.

In the foregoing described pressure vessel design, it is desirable that a secondary or back-up retaining means be provided for securing the plug against axial forces in the event of failure of the primary retaining means. Problems are encountered in the design of such a secondary retaining means, however, since the closure plug should be readily removable from the penetration and insertable therein. Moreover, it is desirable that some means be provided for restricting the flow of gas through the space between the closure plug and the main portion of the reactor pressure vessel in the event of failure of the sealing means which seal the space between the plug and the walls of the penetration. To provide such flow restriction while at the same time permitting easy removal and insertion of the plug also presents problems.

Accordingly, it is an object of the present invention to provide an improved concrete pressure containment vessel for a nuclear reactor.

Another object of the invention is to provide an improved pressure vessel for a nuclear reactor in which a peripherally compressively loaded closure plug in an access penetration is provided with both primary and secondary retaining means and is readily insertable and removable from the access penetration.

It is another object of the invention to provide a pressure vessel for a nuclear reactor in which a peripherally compressively loaded concrete closure plug is provided closing an access penetration, and in which flow restriction is provided in the space between the closure plug and the walls of the penetration while permitting ready insertion and removal of the reactor plug.

Other objects of the invention will become apparent to those skilled in the art from the following description, taken in connection with the accompanying drawings wherein.

Figure 1:
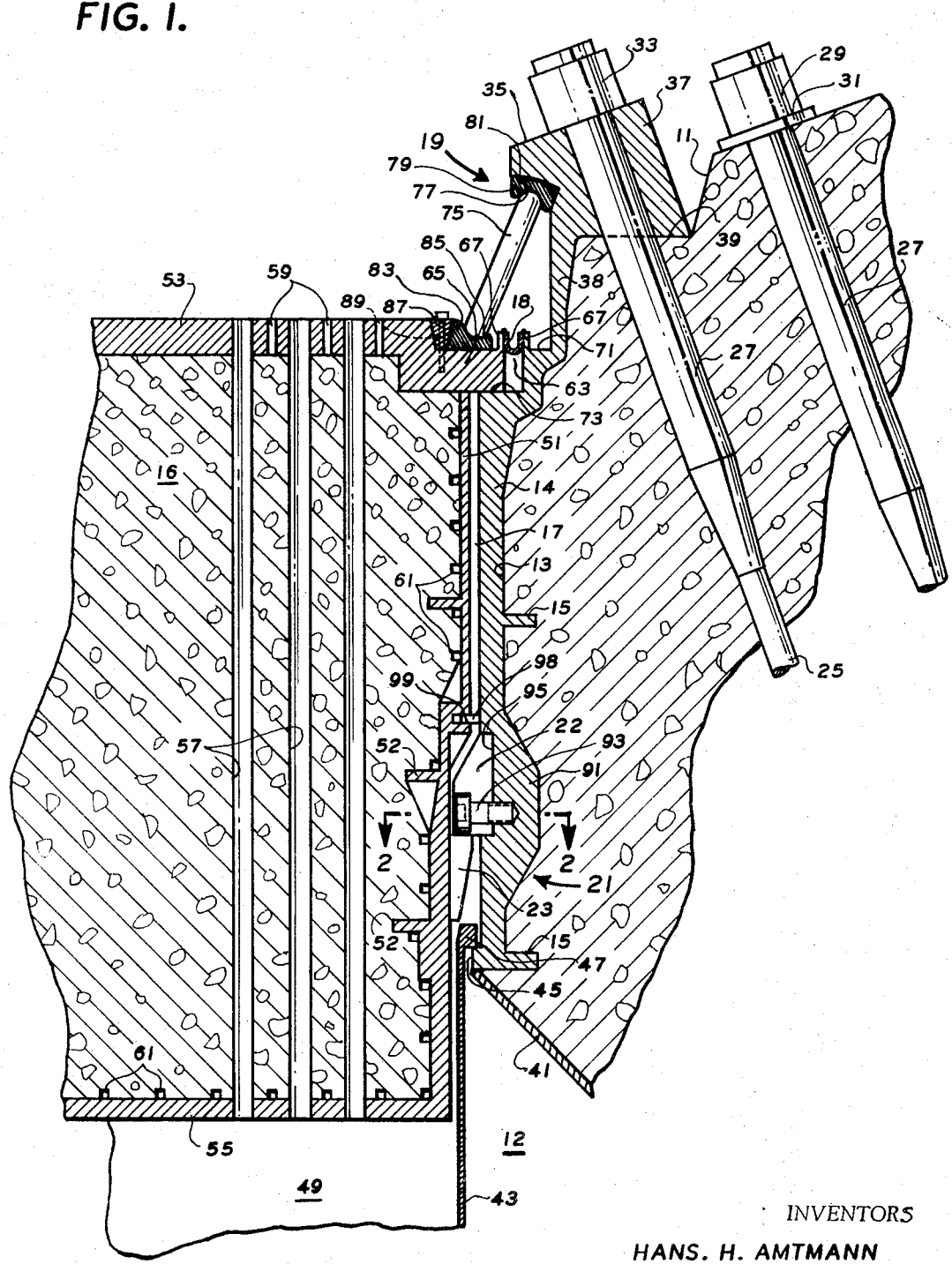
FIG. 1 is a full sectioned view of a portion of a concrete pressure vessel for a nuclear reactor constructed in accordance with the invention.

Very generally, the concrete pressure vessel of the invention comprises a main vessel portion 11 defining a pressure chamber 12. The main vessel portion has at least one penetration 13 therein communicating with the chamber from outside the main vessel portion. A metal penetration liner 14 is provided for the penetration. The penetration liner has at leas one anchor 15 extending therefrom for transferring axial forces to the main vessel portion. A concrete closure plug 16 is provided for closing the penetration. The closure plug 16 is of a size to fit within the penetration and provide a clearance space 17 between the penetration liner and the plug. Means 18 are provided for sealing the space between the plug and the penetration liner near the outer terminus of the penetration to allow the plug to be compressively loaded about its periphery by the pressure within the pressure chamber. Primary retaining means 19 are provided for securing the plug against axial forces, and secondary retaining means 21 are provided for securing the plug against axial forces in the event of failure of the primary retaining means. The secondary retaining means include a plurality of interengageable members 22 and 23 on both the plug and the penetration liner to transfer axial forces on the plug to the penetration liner. At least some of the interengageable members are displaceable with respect to the main vessel portion so that the interengageable members can disengage to permit removal and insertion of the plug.

Referring now more particularly to FIG. 1, the drawing illustrates a portion of a reactor pressure containment vessel for a high temperature reactor employing gas coolant, preferably helium. The concrete main vessel portion 11 of the reactor vessel (shown only partially) is of generally cylindrical shape and may be prestressed by a plurality of external circumferential bands, not shown. The vessel is supported in an upright position on a suitable foundation by a support structure, not illustrated.

Prestressing in the axial direction for the generally cylindrical main vessel portion 11 is provided by a plurality of prestressing tendons 25. The prestressing tendons pass completely through the reactor vessel from end to end and are bowed slightly outward with respect to the axis of the pressure vessel. The ends of the tendons 25 pass through tendon sheaths 27 provided in penetrations in the main vessel portion 11. Except for the innermost circumferential row of tendons 25, the tendons terminate in a suitable anchor 29 bearing against a bearing plate 31. By tightening the anchor 29 against the bearing plate 31, the tendons 25 may be suitably tensioned to provide prestressing for the reactor vessel.

The innermost circumferential row of tendons 25 also are provided with tendon anchors 33 which may be tightened in the manner similar to that of the tendon anchors 29. The tendon anchors 33, however, bear against the upper surface 35 of an annular flange 37 which extends from the penetration liner 14 by means of an upper section 38 thereof. The flange 37 rests on a generally horizontal annular seat 39 on the top surface of the main vessel portion 11.

The pressure chamber 12 defined by the main vessel portion 11 includes a metal liner 41. The only portion of the metal liner 41 which is illustrated is that of a frustoconical section at the top end of the pressure chamber 12 surrounding the lower terminus of the penetration 13. The remainder of the pressure chamber 12, however, which is not visible in the drawing, is a generally cylindrical shape.

A generally cylindrical core shroud or barrel 43 extends downwardly into the pressure chamber 12. The barrel 43 is supported on a shoulder 45 which extends inwardly surrounding the lower end of the penetration liner 14. An annular flange 47 which projects outwardly from the barrel 43 rests on the top of the shoulder 45 for supporting the barrel. The barrel partly defines a plenum 49 just above the reactor core, not illustrated, to which the coolant gas is circulated prior to a downward pass over the core.

In order to close the penetration 13, the closure member 16 is provided. The closure member 16 comprises a concrete plug of generally cylindrical shape, with its cylindrical surface being surrounded by a cladding 51 of suitable metallic material. Shear anchors comprising annular flanges 52 extend inwardly from the cladding 51 into the concrete of the plug. The upper surface of the plug 16 is provided with a top plate 53 and the lower surface of the plug 16 is provided with a bottom plate 55. Relatively small penetrations 57 extend axially through the plug 16 and the plates 53 and 55 to provide access to the core, not shown, for core handling equipment, control rods and drives, etc., not illustrated. Vent holes 59 are provided in the top plate 53 to relieve internal pressures. The inner surface of the liner 51 and the lower or bottom plate 55 are provided with suitable cooling coils 61 connected to an external source of circulating coolant in order to transfer heat from the metal cladding 51 and plate 53 to prevent overheating thereof.

In order to provide sufficient strength for the closure member or plug 16, it is typically necessary to provide means for ensuring that tensile stresses in the material are avoided. Although this may be accomplished by the use of steel prestressing cables, the illustrated embodiment provides a simpler and equally effective means of prestressing the plug 16. The plug 16 is of a size such that a space remains between the plug and the main vessel portion or, more particularly, between the penetration liner 14 and the plug cladding 51. The sealing means 18 are provided at the outer terminus of the penetration 13 or, approximately, at the plane of the upper surface of the plug 16. The sealing means comprise an annular seal of U-shaped cross section spanning an annular space 63 between the outer periphery of the top plate 53 and the inner periphery of the penetration liner 14. More particularly, the upper plate 53 is provided with an annular rim 65 offset slightly downwardly from the main upper plate 53. A sealing ring 67 extends upwardly at the periphery of the rim 65. A similar sealing ring 69 extends upwardly from an annular shelf 71 formed in the penetration liner 14. The U-shaped sealing means has the elongated portions of the U fitted flush against the inner surfaces of facing surfaces of the sealing rings 67 and 69, and is welded thereto along the tops of the sealing rings completely surrounding the penetration. In this way, the internal gas pressure within the pressure chamber 12 is sealed.

It may be noted that support for the weight of the plug 16 is provided by a horizontal shelf 73 formed in the penetration liner 14 near the upper end thereof, upon which the rim 65 of the top plate 53 rests. This supports the plug 16 when the pressure chamber 12 is depressurized, preventing the plug from falling into the pressure chamber.

By providing the space 17, the pressure within the pressure chamber 12 is utilized to eliminate tensile stresses in the plug 16. To accomplish this, the plug has a length to diameter ratio of more than approximately one half. Under these conditions, plug stresses remain compressive at any operating gas pressure because increases in disc bending stress exerted axially upward on the plug 16 are always matched by a corresponding increase in compression from the gas surrounding the cylindrical surface of the plug. This provides an automatic prestressed increase to accommodate the increasing axial stresses on the plug.

In the arrangement illustrated in the drawings, the plug 16 is secured in the penetration 13 in a manner which accommodates relative growth movements and provides the structural redundancy necessary to provide sufficient safety in the overall system. Axial thrust is taken by the primary retaining means 19 which transmits this to the annular flange 37. This load is then transferred through the penetration liner 14 and into the main vessel portion 11 by means of one or more annular anchors 15 comprising horizontal flanges extending into the concrete of the main vessel portion.

The primary retaining means 19 comprise a plurality of segments 75 which are shaped to collectively form a frustoconical ring. The upper edges of the segments are captured in a recess 77 in an annular bearing pad 79. The bearing pad 79 is secured by suitable means, not shown, to the underside of an annular shoulder 81 extending inwardly from the upper flange 37 of the penetration liner 14. An annular bearing pad 83 is provided on the upper surface of the rim 65 and the bearing pad 83 contains a recess 85 in which the lower edges of the segments 75 are captured. As was the case with the bearing pad 79, the bearing pad 83 surrounds the penetration to provide support for the lower edge of the frustoconical ring comprised of the segments 75. Adjustment and proper seating of the segments 75 is provided for by an adjusting ring 87 of wedge-shaped cross section secured between the periphery of the upper plate 53 and the inner periphery of annular pad 83. By adjusting the bolts 89 which hold down the ring 87, suitable adjustment to the segments 75 is effected.

The number of segments 75 utilized may vary depending upon the particular design requirements. A suitable number, for example, may be a total of four segments, each bending through an arc of approximately 90°. The gaps between the segments 75 are made sufficiently small that a complete failure of the sealing means 18 may be tolerated without an undue depressurization rate of the pressure chamber 12. Differential expansion of the plug 16 and changes in the vessel penetration dimensions resulting from concrete creep are accommodated by twists of the frustoconical thrust ring comprised of the segments 75, which behaves as though it were formed of separate struts, each free to tilt. In the vent of failure of the anchorage between the penetration liner 14 and the main pressure vessel portion 11, loading is transferred through the shoulder 81 and flange 37 to the tendons 25 to provide a backup in the vent of failure of the liner 14.

Figure 2:
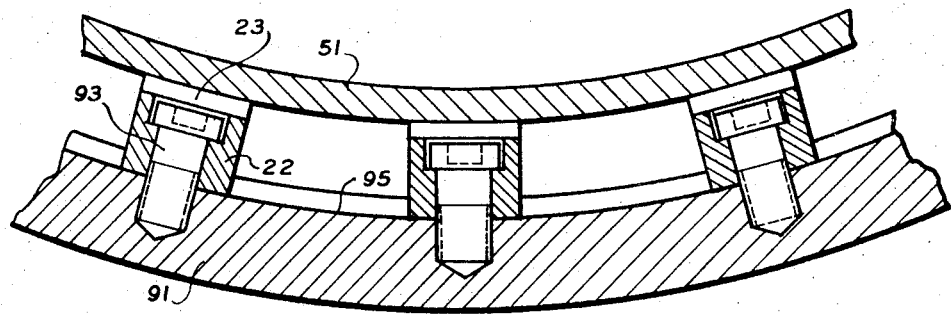
FIG. 2 is a sectional view taken along the line 2—2 of FIG. 1.

In order to provide backup in the event of failure of the primary retaining means 19, a secondary retaining means 21 is provided. This is to prevent ejection of the plug 16 in the event the primary retaining means fails in such a way as to prevent transfer of loading to the tendons 25. Referring to both FIGS. 1 and 2, the particular illustrated secondary retaining means 21 include a plurality of interengageable members 22 and 23. The members 22 comprise roughly wedge-shaped breach blocks which are secured to a thickened portion 91 of the penetration liner 14 by suitable bolts 93. The bolts 93 and the breach blocks 22 are designed to provide sufficient strength as to withstand the vertical forces exerted thereon in the event of a failure of the main retaining means 19. The breach blocks 22 seat in an annular recess 95 formed in the inner face of the liner 14 at the thickened portion 91 thereof. The breach blocks 22 are distributed about the penetration at circumferentially spaced intervals.

The interengageable members 23 are similarly wedge-shaped breach blocks which extend from the plug cladding 51 and are suitably secured thereto, such as by welding, at circumferentially spaced intervals corresponding to the intervals of spacing of the breach blocks 22. By suitably rotating the plug 16, the breach blocks 23 may be aligned with the spaces between the breach blocks 22 so as to enable the plug to be withdrawn upwardly out of the penetration 13.

Prior to securing the primary retaining means 19 in place, the plug is lowered into the penetration until the rim 65 rests upon the shoulder 73 and is then rotated to align the breach blocks 23 with the breach blocks 22 beneath same as shown in the drawings. The primary retaining means 19 is then suitably affixed and adjusted. In this way, the presence of the secondary retaining means 21 does not interfere with insertion and removal of the plug 16 while still providing a backup retaining system in the event of failure of the primary retaining means 19. In the event of failure of the primary retaining means including tendons, struts or structural rings, or a total failure of the liner, the secondary retaining means 21 will transfer the loads on the plug 16 through the plug cladding 51, the breach blocks 23 and 22, through the liner 14 and via the shear anchors 15 into the concrete of the main vessel portion 11.

In the event of a failure of the sealing means 18, a flow restrictor is provided to prevent the rapid loss of pressure within the pressure chamber 12. In FIG. 1, the flow restrictor comprises a segmented ring 98 which fits within an annular slot 99 about midway along the axial length of the plug cladding 51. The segmented configuration of the ring 98 allows it to conform with the contour of the liner 14 of the penetration 13. A suitable spring or other device, not shown, exerts a radially outward force on the ring 98 to bias it into engagement with the inner surface of the liner 14. The flow restrictor ring 98 thus partially seals the space 17 to restrict flow of gas therethrough in the event of a failure of the sealing means 18.

Figure 3:
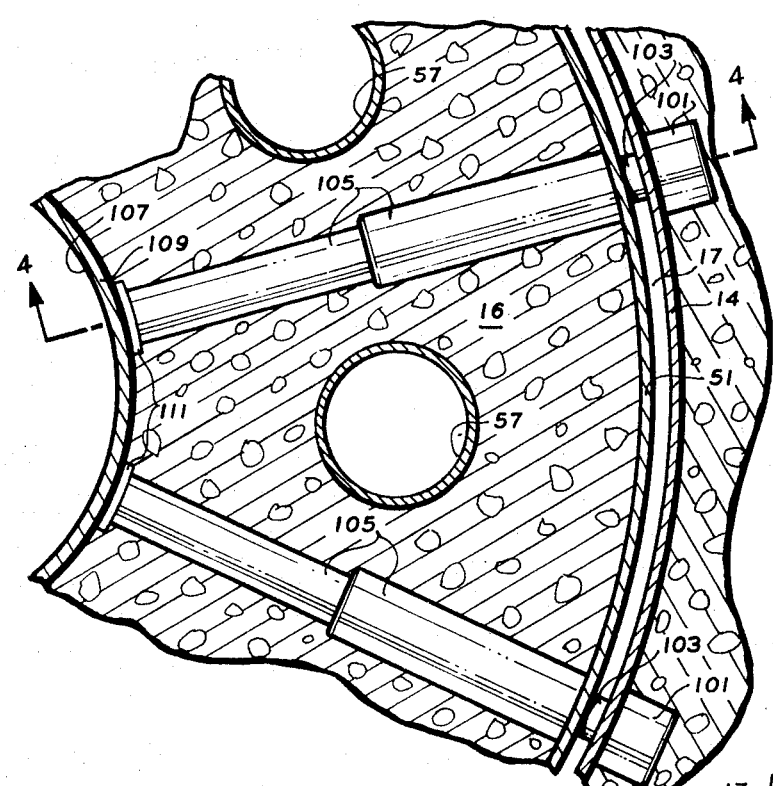
FIG. 3 is a sectional view similar to FIG. 2 illustrating an alternative embodiment of the invention.
Figure 4:
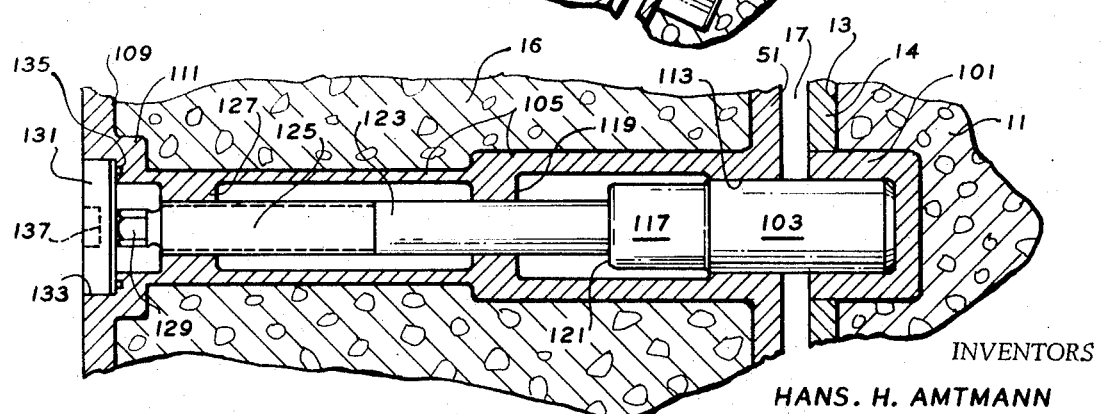
FIG. 4 is an enlarged sectional view taken along the line 4—4 of FIG. 3.

Under some circumstances it may either be not desirable or not possible to rotate the plug 16 after insertion into the penetration 13. A secondary retaining means 21 suitable for use in such circumstances is illustrated in FIGS. 3 and 4. In this case, the penetration liner 14 is provided with a plurality of interengageable members consisting of circumferentially spaced cups 101 distributed about the penetration liner. The interengageable members on the plug 16 comprise a plurality of sliding pins 103 which extend radially from the plug and engage in the cups or sockets 101. Each of the pins 103 is disposed within a housing 105 which passes radially through a suitable opening in the plug 16 from a central penetration 107. The central penetration 107 is provided with a liner 109 and the housings 105 project from bosses 111 formed in the liner 109.

Referring particularly to FIG. 4, the interior of the housing 105 may be more readily seen. The interior of the housing is provided with a guide surface 113 in sliding engagement with the outer surface of the pin 103 for guiding same. The pin 103 includes a stop member 117. The stop member 117 is designed to engage an inwardly projecting wall 119 within the housing 105 at the rearward surface 121 of the stop 117 when the pin is in the fully retracted position, as will be explained. In order to retract the pin 103 from the socket or cup 101, the pin 103 is provided with an actuator shaft 123 having a threaded section 125 thereon. The threaded section 125 of the actuator shaft 123 is threadably engaged with an annular projection 127 within the housing 105 near the end thereof adjacent the liner 109. A socket head 129 is provided on the end of the actuator rod 123 opposite the pin 103 in order to rotate the actuator rod and thus move the pin radially with respect to the threaded annular section 127 of the housing 105.

By extending suitable means, not shown, through thepenetration 107, for engaging and rotating the socket head 129, the pins 103 may be retracted from the cups 101 or inserted therein. With the pins in the inserted position, a suitable seal is effected by means of a seal cap 131 secured in an access penetration 133 between the penetration 107 and the interior of the housing 105. An annular seal 135 is provided between the seal cap 131 and the boss 111. A recess 137 is provided in the seal cap for removing same from the penetration 133.

Figure 5:
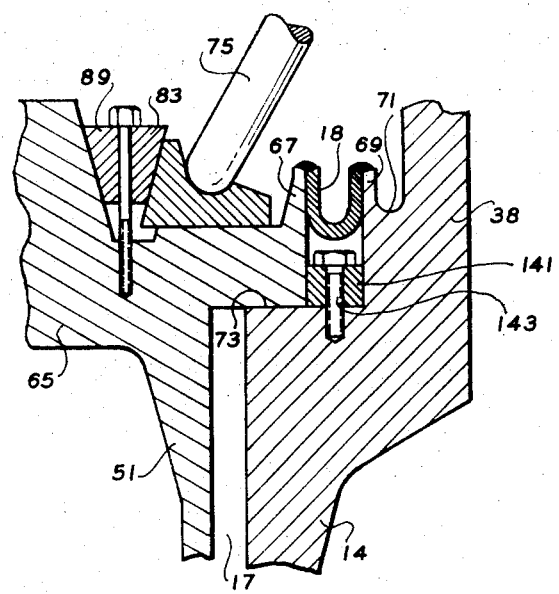
FIG. 5 is a sectional view illustrating an alternative form of flow restriction in the pressure vessel of the invention.

An alternative design for a flow restrictor is illustrated in FIG. 5. In FIG. 5, the flow restrictor comprises a ring 141 which sits on the shoulder 73 of the penetration liner 14 and which occupies the space between the rim 65 and the inner surface of the penetration liner above the shoulder 73. The ring 141 is bolted to the shoulder 73 by a plurality of bolts 143 and the ring 141 may be either of segmented construction or may be a solid ring. In either case, the presence of the ring 141 is sufficient to provide a restriction of the space between the plug 16 and the main pressure vessel 11 to restrict the flow of gas therethrough in the event of failure of the primary sealing means 18.

Figure 6:
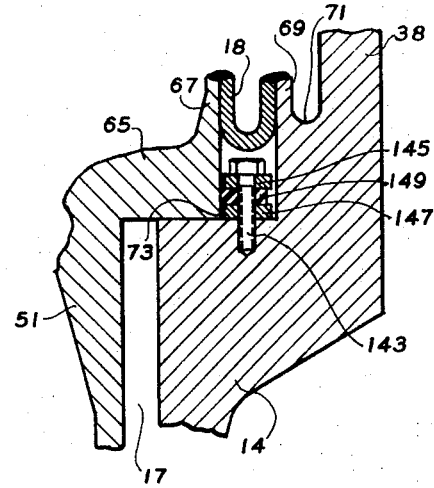
FIGS. 6, 7 and 8 are sectional views similar to FIG. 5 illustrating further alternative flow restriction arrangements.

Referring to FIG. 6, a flow restrictor design similar to that illustrated in FIG. 5 is shown. In FIG. 6, the flow restrictor is comprised of a plurality of layers instead of the single ring 141. The lower and upper layers comprise a plurality of sections 145 and 147 of steel. The inner layer 149 comprises a split ring of a suitable packing material. The segments of the layers 145, 147 and 149 are sandwiched and secured to the shoulder 73 by bolts 143. The dimensions of the split ring 149 are selected such that the ring engages at least one of the surfaces of the penetration liner or the rim 65 to provide a sealing action to enhance flow restriction.

Figure 7:
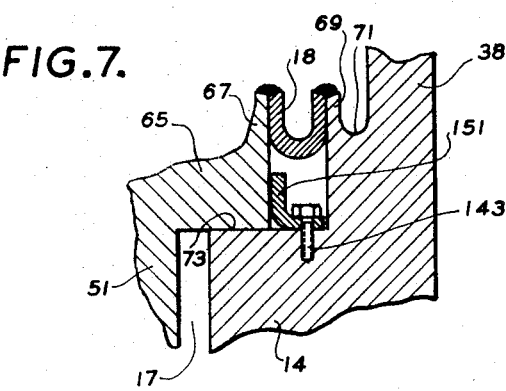

Referring to FIG. 7, a still further form of flow restrictor design is illustrated. In FIG. 7, a ring 151 is utilized of generally L-shaped cross section. The ring 151 has a vertical portion which abuts against the outer surface of the rim 65. The ring 151 is held down by the bolts 143.

Figure 8:
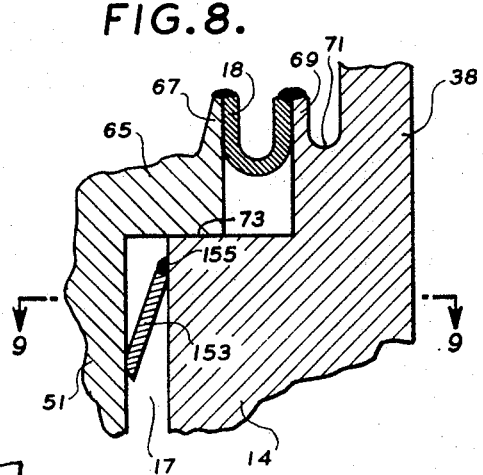
Figure 9:
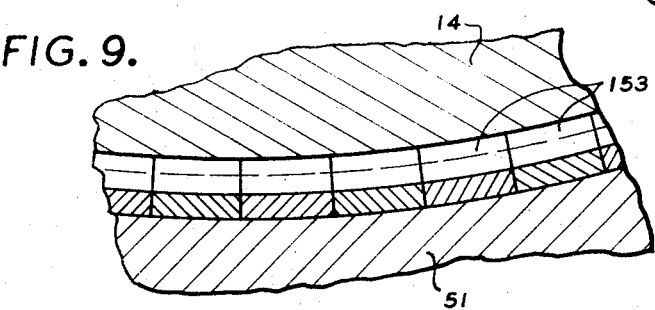
FIG. 9 is a sectional view taken along the line 9—9 of FIG. 8.

In FIGS. 8 and 9, a still further type of flow restrictor design is illustrated. In the design of FIGS. 8 and 9, a plurality of steel plate segments are arranged in the space 17 below the underside of the rim 65. Welds 155 are provided at the upper edges of the plates 153. The plates 153 extend angularly downward with their uppermost edges abutting the inner surface of the penetration liner 14 and with their lowermost edges abutting the outer surface of the plug cladding 51. The plurality of plates 153 are arranged to thereby form a frustoconical barrier extending across the space 17. The provision of a weld 155 at only one edge of the plates enables the unwelded edges of the plates to press against and be displaced with respect to the plug 16. Thus, variations in dimensions are easily tolerated. By selecting an appropriate configuration for the plates 153, sufficient flow restriction can be provided in the event of a failure of the sealing means 18, to prevent sudden depressurization of the pressure chamber 12.

It may therefore be seen that the invention provides an improved concrete pressure containment vessel for a nuclear reactor. A peripherally compressively loaded closure plug in an access penetration is provided with both primary and secondary retaining means and is readily insertable and removable from the access penetration. Flow restriction is provided in the space between the closure plug and the walls of the penetration while permitting ready insertion and removal of the plug.

Various modifications of the invention in addition to those shown and described herein will become apparent to those skilled in the art from the foregoing description and accompanying drawings. Such modifications are intended to fall within the scope of the appended claims.

What is claimed is:

1. A concrete pressure vessel for a nuclear reactor, comprising, a main vessel portion defining a pressure chamber, said main vessel portion having at least one penetration therein communicating with said chamber from outside said main vessel portion, a metal penetration liner for said penetration, said penetration liner having at least one anchor extending therefrom for transferring axial forces to said main vessel portion, a concrete closure plug for closing said penetration, said closure plug being of a size to fit within said penetration with a clearance space between said penetration liner and said plug, means for sealing the space between said plug and said penetration liner near the outer terminus of said penetration to allow said plug to be compressively loaded about its periphery by the pressure within said pressure chamber, primary retaining means for securing said plug against axial forces, and secondary retaining means for securing said plug against axial forces in the event of failure of said primary retaining means, said secondary retaining means including a plurality of interengageable members on both said plug and said penetration liner to transfer axial forces on said plug to said penetration liner, at least some of said interengageable members being displaceable to disengage and permit removal and insertion of said plug.

2. A pressure vessel according to claim 1 including flow restrictor means between said sealing means and said chamber in the space between said penetration liner and said plug for inhibiting the flow of gas through said space in the event of failure of said sealing means.

3. A pressure vessel according to claim 2 wherein said flow restrictore means comprise at least one segmented ring surrounding said plug, and means for biasing the segments of said ring outwardly of said plug to engage said liner.

4. A pressure vessel according to claim 2 wherein said flow restrictor means comprise a ring secured to said penetration liner adjacent said sealing means on the side thereof toward said chamber.

5. A pressure vessel according to claim 4 wherein said ring is comprised of three layers, namely, two outer layers comprised of a plurality of metal segments, and an inner layer of packing material sandwiched therebetween.

6. A pressure vessel according to claim 4 wherein said ring has a generally L-shaped cross section with one leg of said L abutting a surface of said plug.

7. A pressure vessel according to claim 4 wherein said ring is of generally frustoconical shape having an outer rim engaging said penetration liner and having an inner rim engaging said plug.

8. A concrete pressure vessel according to claim 1 wherein said interengageable members comprise a plurality of shear blocks secured to said penetration liner and said plug at peripherally spaced intervals, said intervals being such as to allow said shear blocks on said plug to pass between said shear block on said liner with said plug at a first angular position in said penetration, and to align with each other with said plug at said second angular position in said penetration, said shear blocks on said plug being axially located to be on the chamber side of said shear blocks on said liner when said plug is in the second angular position.

9. A pressure vessel according to claim 1 wherein said interengageable members comprise a plurality of slidable pins mounted to extend radially from said plug at peripherally spaced intervals, and wherein a plurality of sockets are provided in said penetration liner for receiving said slidable pins when said plug is in said penetration.

10. A pressure vessel according to claim 1 wherein said main vessel portion includes a seat extending about the periphery of said penetration for engaging and supporting said plug to prevent same from being inadvertently dropped into said chamber.

11. A pressure vessel according to claim 10 including an annular flow restrictor of L-shaped cross section having one leg of the L mounted to said seat and having the other leg of the L abutting the periphery of said plug to inhibit the flow of gas through the space between said penetration liner and said plug in the event of failure of said sealing means.

12. A pressure vessel according to claim 1 wherein said penetration liner includes a plurality of shear anchors comprising annular flanges extending radially outward and embedded in the concrete of said main vessel portion.

13. A pressure vessel according to claim 1 wherein said plug includes a metal cladding surrounding same, said metal cladding having a plurality of shear anchors comprising annular flanges extending radially inward and embedded in the concrete of said plug.

14. A pressure vessel for a nuclear reactor, comprising, a main vessel portion defining a pressure chamber, said main vessel portion having at least one penetration therein communicating with said chamber from outside said main vessel portion, a metal penetration liner for said penetration, said penetration liner having at least one anchor extending therefrom for transferring axial forces to said main vessel portion, a closure plug for closing said penetration, primary retaining means for securing said plug against axial forces, and secondary retaining means for securing said plug against axial forces in the event of failure of said primary retaining means, said secondary retaining means including a plurality of interengageable members on both said plug and said penetration liner to transfer axial forces on said plug to said penetration liner, at least some of said interengageable members being displaceable to disengage and permit removal and insertion of said plug.

15. A concrete pressure vessel according to claim 14 wherein said interengageable members comprise a plurality of shear blocks secured to said penetration liner and said plug at peripherally spaced intervals, said intervals being such as to allow said shear blocks on said plug to pass between said shear blocks on said liner with said plug at a first angular position in said penetration, and to align with each other with said plug at said second annular position in said penetration, said shear blocks on said plug being axially located to be on the chamber side of said shear blocks on said liner when said plug is in the second angular position.

16. A pressure vessel according to claim 14 wherein said interengageable members comprise a plurality of axially movable pins mounted to extend radially from said plug at peripherally spaced intervals, and wherein a plurality of sockets are provided in said penetration liner for receiving said pins when said plug is in said penetration.

* * * * *